(12) United States Patent
Pyo et al.

(10) Patent No.: US 11,298,666 B2
(45) Date of Patent: Apr. 12, 2022

(54) SLURRY MIXER FOR A BATTERY ELECTRODE

(71) Applicant: TSI CO.LTD., Hwaseong-si (KR)

(72) Inventors: In Sik Pyo, Hwaseong-si (KR); Chang Hee An, Cheonan-si (KR); Shin Gu Kang, Hwaseong-si (KR)

(73) Assignee: TSI CO., LTD., Hwaseong-si (KR)

( * ) Notice: Subject to any disclaimer, the term of this patent is extended or adjusted under 35 U.S.C. 154(b) by 343 days.

(21) Appl. No.: 16/491,348

(22) PCT Filed: Jul. 9, 2019

(86) PCT No.: PCT/KR2019/008453
§ 371 (c)(1),
(2) Date: Sep. 5, 2019

(87) PCT Pub. No.: WO2020/189855
PCT Pub. Date: Sep. 24, 2020

(65) Prior Publication Data
US 2021/0213403 A1 Jul. 15, 2021

(30) Foreign Application Priority Data
Mar. 15, 2019 (KR) .................. 10-2019-0029747

(51) Int. Cl.
*B22C 5/00* (2006.01)
*B01F 27/84* (2022.01)
(Continued)

(52) U.S. Cl.
CPC .............. *B01F 27/84* (2022.01); *B01F 23/53* (2022.01); *B01F 27/091* (2022.01);
(Continued)

(58) Field of Classification Search
CPC ...................................................... B01F 7/166
See application file for complete search history.

(56) References Cited

U.S. PATENT DOCUMENTS

| 4,606,647 A | * | 8/1986 | Frye | .................... B01F 7/00125 |
| | | | | 366/168.1 |
| 2011/0187099 A1 | * | 8/2011 | Wittek | .................. B01F 3/0807 |
| | | | | 285/405 |

FOREIGN PATENT DOCUMENTS

| CN | 1373786 A | * | 10/2002 | ............... B29B 7/42 |
| GB | 2211435 A | * | 7/1989 | .............. B01F 7/166 |

(Continued)

OTHER PUBLICATIONS

Google machine translation of KR-101737756-B1 (Year: 2017).*
Google machine translation of CN-1373786-A (Year: 2002).*

*Primary Examiner* — Anshu Bhatia
*Assistant Examiner* — Gregory Y Huan
(74) *Attorney, Agent, or Firm* — Novick, Kim & Lee, PLLC; Jae Youn Kim

(57) ABSTRACT

A slurry mixer for a battery electrode capable of maximally simplifying a configuration of a high-speed stirring body to minimize a rotational load, such that a stirring time of the slurry may be greatly reduced and productivity may be increased, preventing a powdery material from being accumulated on an upper side face and an upper surface of a low-speed stirring body, preventing a deterioration in a performance, failure and a reduction in a life span of a high-speed stirring shaft and bearing, and uniformly stirring mixed materials located at inner corners and a bottom of a container, thereby further increasing stirring efficiency.

7 Claims, 12 Drawing Sheets

(51) Int. Cl.
  *H01M 4/04*      (2006.01)
  *B01F 23/53*     (2022.01)
  *B01F 27/091*    (2022.01)
  *B01F 27/113*    (2022.01)
  *B01F 27/2122*   (2022.01)
  *B01F 27/1125*   (2022.01)
  *B01F 35/92*     (2022.01)
  *B01F 35/71*     (2022.01)
  *B01F 23/50*     (2022.01)
  *B01F 35/90*     (2022.01)
  *B01F 35/30*     (2022.01)

(52) U.S. Cl.
  CPC ...... *B01F 27/113* (2022.01); *B01F 27/11253* (2022.01); *B01F 27/2122* (2022.01); *B01F 35/712* (2022.01); *B01F 35/7179* (2022.01); *B01F 35/92* (2022.01); *H01M 4/04* (2013.01); *B01F 23/565* (2022.01); *B01F 2035/351* (2022.01); *B01F 2035/352* (2022.01); *B01F 2035/98* (2022.01)

(56) References Cited

FOREIGN PATENT DOCUMENTS

| | | | |
|---|---|---|---|
| KR | 10-2013-0125147 A | 11/2013 | |
| KR | 10-1737756 B1 | 5/2017 | |
| KR | 101737756 B1 * | 5/2017 | |

* cited by examiner

SLURRY MIXER FOR A BATTERY ELECTRODE

TECHNICAL FIELD

The present invention relates to a slurry mixer for a battery electrode, and more particularly, to a slurry mixer for a battery electrode in which a mixed material of liquid and powdery materials may be dispersed during manufacturing of a slurry used for forming a battery electrode so as to achieve uniform mixing of the mixed material.

BACKGROUND ART

In recent years, using a battery that can be continuously used through recharging with electricity has been proposed as a solution to environmental pollution by reducing a use of fossil fuel and actively recycling a renewable energy. A secondary battery is universally employed as a power source of portable electronic devices such as a mobile phone, notebook computer or the like. In particular, secondary battery production has been significantly increased due to active development of electric vehicles.

Among methods for manufacturing such a secondary battery, there is a method of using application, in which a slurry for an electrode including an electrode active material, a conductive material, a binder and a solvent for dissolving the binder is applied to a current collector, followed by drying to form a battery electrode.

When preparing the slurry for an electrode, it is necessary to physically and uniformly disperse and mix liquid and powdery materials including the electrode active material, the conductive material, the binder and the solvent. Thereby, it possible to prepare a slurry mixture having fluidity and viscosity suitable for application while having material properties usable as the electrode for a battery.

The slurry mixture has been prepared by a dispersing and feeding method in which a mixed material of liquid and powdery materials is dispersed and stirred while replacing a conventional mixer with a mixer suitable for stirring according to the mixed material until now. However, the dispersing and feeding method is disadvantageous in that not only the feeding operation of the mixed material is troublesome but also the stirring time is very long, about 7 to 8 hours, such that productivity is very low.

In order to solve the above-described disadvantages, the present applicant has developed a slurry mixer for a battery electrode, which is capable of eliminating the troublesomeness and reducing the stirring time by feeding the mixed material at once when preparing the slurry for an electrode, and has granted a patent as Korean Patent Registration No. 10-1737756 (hereinafter referred to as a "prior patent").

However, as shown in FIG. 1, the above-described prior patent uses a method in which liquid and powdery materials are fed into a container 2 through a plurality of feed ports 1a formed around a cover 1, wherein the feed ports 1a are located at positions higher than an upper portion 3a of a low-speed stirring body 3. Therefore, in a case of the powdery material, a phenomenon, in which a portion of the mixed material is adhered to a side of the upper portion 3a of the low-speed stirring body 3 or is accumulated on an upper surface thereof, thereby being not mixed with other materials to be mixed, occurs.

Thereby, a minute error occurs in a mixing ratio between the materials, which may affect characteristics of the prepared slurry for manufacturing an electrode after stirring. In addition, for the next stirring operation, an inside of the container 2 is cleanly cleaned. At this time, since the powdery material adhered to the side of the upper portion 3a of the low-speed stirring body 3 and the powdery material accumulated on the upper surface of the upper portion 3a should be clearly washed off, the washing operation is troublesome and takes a lot of time.

Further, as shown in FIG. 1, the slurry mixer of the prior patent includes a high-speed drive shaft 5 for rotating a high-speed stirring body 4 at a high speed, and a low-speed drive shaft 6 for rotating the low-speed stirring body 3 at a lower speed. The high-speed drive shaft 5 and the low-speed drive shaft 6 have a dual shaft structure in which the low-speed drive shaft 6 surrounds an outer circumferential surface of the high-speed drive shaft 5.

Accordingly, the high-speed drive shaft 5 and a bearing 5a for supporting the high-speed drive shaft 5 are overheated by self-heating due to high-speed rotation and high heat generated during mixing the materials in the container 2, and the high-speed drive shaft 5 and the bearing 5a are surrounded by the low-speed drive shaft 6, such that it is a structure that makes dissipation of the heat be difficult. Therefore, there is a problem that these components may easily be deteriorated to reduce a life span when using in long-term.

SUMMARY OF INVENTION

Problems to be Solved by Invention

In consideration of the above-mentioned circumstances, it is an object of the present invention to provide a slurry mixer for a battery electrode which is capable of feeding a mixed material at once to be uniformly dispersed and mixed, and maximally simplifying a configuration of a high-speed stirring body (impeller) to minimize a rotational load, such that a stirring time of the slurry may be greatly reduced and productivity may be increased.

In addition, another object of the present invention is to provide a slurry mixer for a battery electrode which prevents a powdery material fed into a container through feed ports from being accumulated on an upper side face and an upper surface of a low-speed stirring body, such that a mixing ratio of materials to be mixed may be maintained as precisely as possible, and a washing operation inside the mixer may be easily performed.

Further, another object of the present invention is to provide a slurry mixer for a battery electrode in which a cooling means may be provided in a high-speed drive shaft and bearings, thus to prevent a deterioration in a performance, failure and a reduction in a life span due to overheating.

Furthermore, another object of the present invention is to provide a slurry mixer for a battery electrode which can uniformly stir mixed materials located at inner corners and a bottom of a container, thereby further increasing stirring efficiency.

Means for Solving Problems

To achieve the above objects, according to an aspect of the present invention, there is a provided a slurry mixer for a battery electrode which includes: a container whose upper portion is opened to receive a mixed material including a liquid material and a powdery material; a cover which is connected to the container to open and close the open upper portion thereof and has feed ports formed therein so as to feed the mixed material into the container; a low-speed stirring body vertically installed along an inner circumferential surface of the container to move the mixed material in an edge portion of the container toward a center thereof; a hollow low-speed drive shaft rotatably supported by the cover with being vertically inserted therein, and fixed with the low-speed stirring body; a high-speed stirring body located at a lower center in the container to flow and stir the mixed material; and a high-speed drive shaft rotatably supported by the low-speed drive shaft with being vertically inserted therein, and fixed with the high-speed stirring body, the slurry mixer for a battery electrode including: a plurality of cylindrical nozzle sockets which are coupled to the cover in a penetration manner, and have a first opening formed at one end thereof on an inner side of the cover, and a second opening formed at the other end thereof on an outer side of the cover, respectively; liquid injection nozzles screwed to the first opening of each nozzle socket so as to inject the liquid material toward an upper portion of the low-speed stirring body inside the container; liquid supply chamber lids fixed to the cover along an outer wall surface thereof so as to form liquid supply chambers connecting all area defined in a circumferential direction of the cover, while blocking the second opening of each nozzle socket from an outside; and liquid supply ports provided in the liquid supply chamber lids to supply the liquid material into the liquid supply chambers.

According to an aspect of the present invention, there is a provided a slurry mixer for a battery electrode which includes: a container whose upper portion is opened to receive a mixed material including a liquid material and a powdery material; a cover which is connected to the container to open and close the open upper portion thereof and has feed ports formed therein so as to feed the mixed material into the container; a low-speed stirring body vertically installed along an inner circumferential surface of the container to move the mixed material in an edge portion of the container toward a center thereof; a hollow low-speed drive shaft rotatably supported by the cover with being vertically inserted therein, and fixed with the low-speed stirring body; a high-speed stirring body located at a lower center in the container to flow and stir the mixed material; and a high-speed drive shaft rotatably supported by the low-speed drive shaft with being vertically inserted therein, and fixed with the high-speed stirring body, the slurry mixer for a battery electrode including: a plurality of cylindrical nozzle sockets which are fitted and detachably coupled to the cover in a penetration manner and are installed along the periphery of the cover, and have a first opening formed at one end thereof on an inner side of the cover, a closed end formed at the other end thereof on an outer side of the cover, and a second opening formed between the first opening and the closed end, respectively; liquid injection nozzles screwed to the first opening of each nozzle socket so as to inject the liquid material toward an upper portion of the low-speed stirring body inside the container; liquid supply chamber lids which respectively have an assembly hole through which an outer end of each nozzle socket is inserted, and are fixed to the cover along an outer wall surface thereof so as to form liquid supply chambers connecting all area defined in a circumferential direction of the cover, while blocking the second opening of each nozzle socket from an outside; a cap which is screwed to the assembly hole of the liquid supply chamber lid to open and close the same, and presses the outer end of the nozzle socket to maintain a fixed state of the nozzle socket; and liquid supply ports provided in the liquid supply chamber lids to supply the liquid material into the liquid supply chambers.

In one embodiment of the present invention, the slurry mixer for a battery electrode further includes: a first bearing disposed inside the cover between the high-speed drive shaft and the low-speed drive shaft so as to rotatably support the high-speed drive shaft, and a second bearing disposed between an upper end portion of the high-speed drive shaft and an upper end face of the low-speed drive shaft which are disposed outside the cover, so as to rotatably support the high-speed drive shaft; a first air passage formed by drilling a body of the low-speed drive shaft located outside the cover inward; a first cooling jacket formed between one side of the first bearing and an opposite side of the low-speed drive shaft facing thereto; a second cooling jacket formed between one side of the second bearing and the opposite side of the low-speed drive shaft facing thereto; a second air passage formed by drilling a body of the low-speed drive shaft to communicate the first air passage with the first cooling jacket; a third air passage formed in an inner circumferential surface of the low-speed drive shaft surrounding the high-speed drive shaft to communicate the first cooling jacket with the second cooling jacket; a housing which is fixed to the cover so as to surround the first air passage of the low-speed drive shaft in a circumferential direction, and has an air inlet hole formed therein at a position facing the first air passage; a ring body which is installed between the low-speed drive shaft and the housing, and has a first air chamber formed in a surface thereof facing the air inlet hole of the housing so as to surround the air inlet hole in the circumferential direction, a second air chamber formed in a surface thereof facing the first air passage of the low-speed drive shaft so as to surround the first air passage in the circumferential direction, and a through hole formed therein so as to communicate the first air chamber with the second air chamber; an air cooling device installed in the air inlet hole of the housing to supply a cooling air; a cover plate fixed to an upper end of the housing to prevent the ring body from being removed; a first seal member provided between an upper surface of the ring body and the cover plate; and a second seal member provided between a bottom surface of the ring body and the housing.

In one embodiment of the present invention, the container includes a horizontal bottom surface, and the inner circumferential surface vertically erected from the bottom surface, wherein the low-speed stirring body includes: a vertical wing part vertically installed close to the inner circumferential surface of the container and configured to move the mixed material in close proximity to the inner circumferential surface of the container toward the center; a horizontal wing part horizontally extending from a lower end of the vertical wing part close to the bottom surface of the container toward the center, and configured to move the mixed material in close proximity to the bottom surface of the container upward; and an inclined wing part which connects an upper end of the vertical wing part and a lower end of the low-speed drive shaft, wherein the vertical wing part has a cross-sectional shape including a blade section which is formed in a curved surface corresponding to the inner circumferential surface of the container to remove the mixed material adhered to the inner circumferential surface of the container, and vortex forming sections formed slantly in directions in which ends thereof meet each other at both ends of the blade section to move the mixed material in close proximity to the inner circumferential surface of the container toward the center, the horizontal wing part has a cross-sectional shape including a blade section formed in a flat shape corresponding to the bottom surface of the container to remove the mixed material adhering to the bottom surface of the container, and vortex forming sections formed slantly in directions in which ends thereof meet each other at both ends of the blade section to move the mixed material in close proximity to the bottom surface of the container upward.

In one embodiment of the present invention, the high-speed stirring body includes: a conical part having a shape whose lower end outer diameter is larger than the upper end outer diameter; a rotary plate which is provided at a lower portion of the conical part and is formed in a plate shape in which a plurality of stirring pieces and stirring grooves are alternately arranged in a radial direction about a rotational axis of the high-speed drive shaft; and stirring rods vertically fixed to the stirring piece of the rotary plate in a direction of the rotational axis of the high-speed drive shaft.

In one embodiment of the present invention, the rotary plate included in the high-speed stirring body has a plurality of fixing holes formed in the stirring pieces thereof in the radial direction, and the stirring rods are detachably installed in the fixing holes of the stirring pieces, so that the number and installation positions of the stirring rods are adjusted corresponding to a change in a rotational load during stirring.

Advantageous Effects

According to the slurry mixer for a battery electrode of the present invention having the above-described characteristic configuration, by causing a vortex while rotating the mixed material including the liquid material and the powdery material at a high speed using the high-speed stirring body rotating at a high speed and the low-speed stirring body rotating at a low speed, a uniform stirring operation may be performed. In addition, as the configuration of the high-speed stirring body is greatly simplified, a rotational load during stirring may be reduced as much as possible, and a rotation of the high-speed stirring body may be set at a high speed, and thereby greatly reducing the stirring time and increasing productivity.

In addition, according to the slurry mixer for a battery electrode of the present invention, since installation positions and the number of installed stirring rods of the high-speed stirring body may be increased or decreased, it is possible to achieve an optimum rotational load of the high-speed stirring body, which is differently applied depending on a particle size, a specific and a mixing ratio of materials to be mixed, and thereby a deterioration in the stirring efficiency may be prevented.

Further, according to the slurry mixer for a battery electrode of the present invention, the liquid material is fed into the container through the liquid injection nozzles provided in the cover during feeding, such that it is possible to wash the powdery materials adhered or accumulated on the side and upper surface of the upper portion of the low-speed stirring body. Thereby, it is possible to prevent some of the powdery materials from being not stirred, thereby maintaining the mixing ratio of entire materials to be mixed as accurately as possible, and eliminating the troublesomeness to remove the powdery materials adhered to the low-speed stirring body when washing the inside of the container.

Further, according to the slurry mixer for a battery electrode of the present invention, the air passage communicating with the high-speed drive shaft and the bearings is formed to allow the cooling air to flow, such that it is possible to prevent the high-speed drive shaft and the bearings from being overheated, and thereby solving problems such as a reduction in stirring performance, a failure due to a deterioration of the components, and a reduction in the life span.

Furthermore, according to the slurry mixer for a battery electrode of the present invention, the low-speed stirring body is formed by the vertical wing part and the horizontal wing part corresponding to the inner circumferential surface and the bottom surface of the container, such that the mixed materials adhered to the inner circumferential surface and the bottom surface of the container may be separated, as well as the mixed material located at the edge and bottom of the container may be moved toward the center, thereby further improving the stirring efficiency.

MODE FOR CARRYING OUT INVENTION

Hereinafter, preferred embodiments of the present invention will be described in detail with reference to the accompanying drawings.

Figure 1:
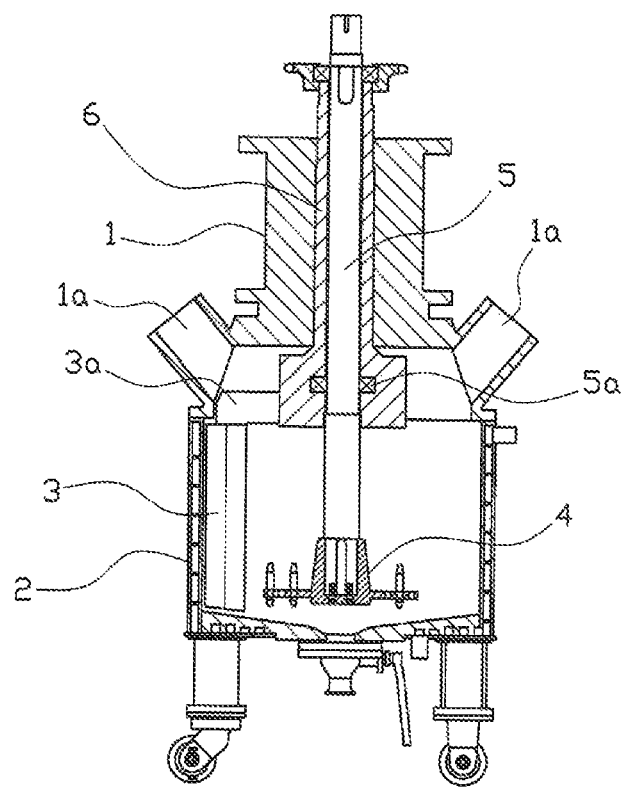
FIG. 1 is a cross-sectional view illustrating a conventional slurry mixer for a battery electrode.
Figure 2:
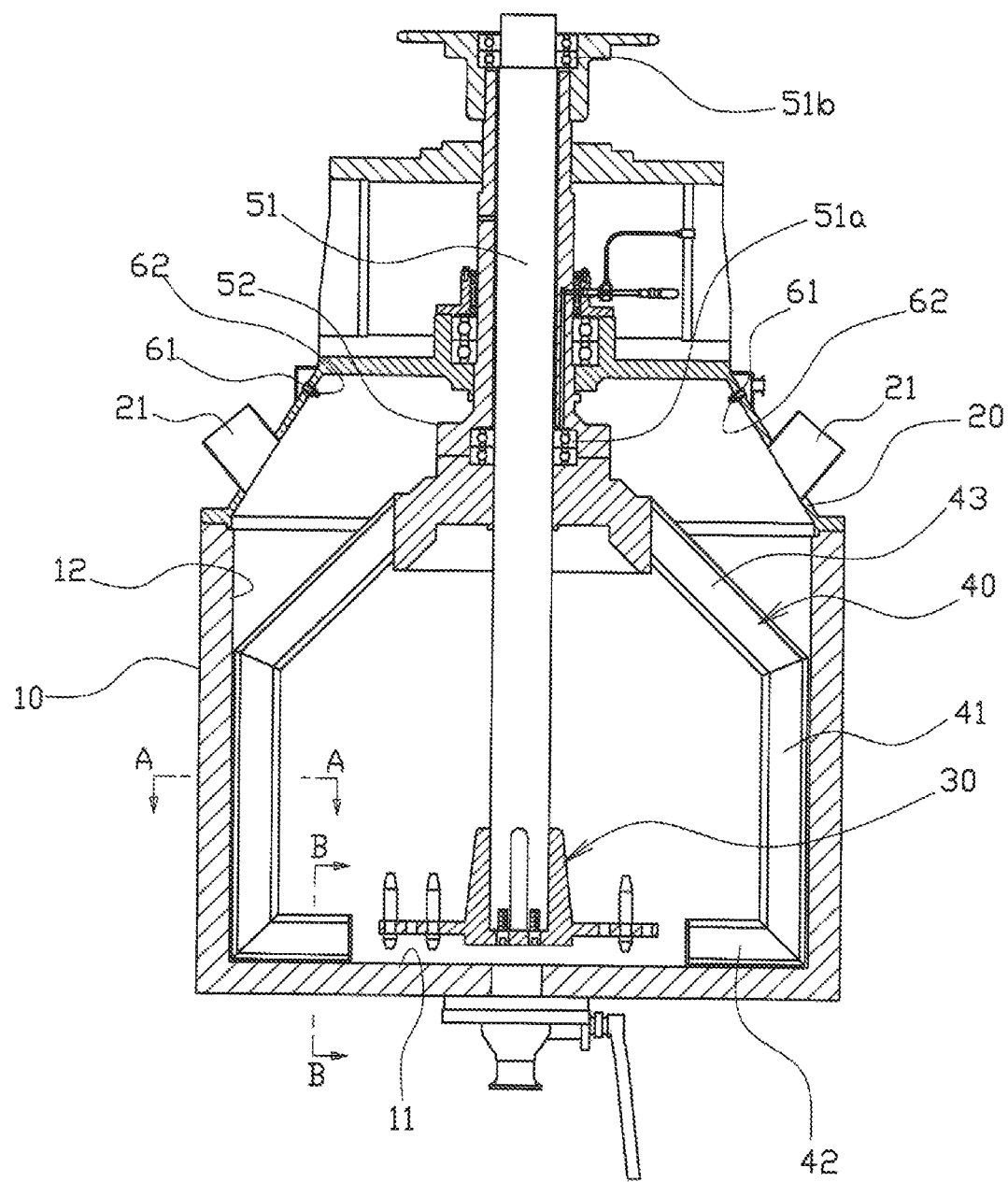
FIG. 2 is a cross-sectional view illustrating a slurry mixer for a battery electrode according to the present invention.

FIG. 2 is a cross-sectional view illustrating a slurry mixer for a battery electrode according to the present invention. As shown in FIG. 2, the slurry mixer includes a cylindrical container 10 in which a mixed material of liquid and powdery materials for preparing a slurry for a battery electrode may be received. The container 10 has a tubular shape whose upper portion is open, and includes a flat horizontal bottom surface 11, and an inner circumferential surface 12 vertically erected from an edge of the bottom surface 11.

The container 10 has a cover 20 which openably/closably covers the open upper portion thereof. The cover 20 is provided with a plurality of feed ports 21 which may feed the liquid material and the powdery material into the container 10.

The mixed material fed into the container 10 is uniformly stirred by a high-speed stirring body 30 rotating at a high speed and a low-speed stirring body 40 rotating at a low speed.

The high-speed stirring body 30 and the low-speed stirring body 40 are rotated by a high-speed drive shaft 51 and a low-speed drive shaft 52 which are rotatably installed in the cover 20 while vertically penetrating therethrough, respectively. The high-speed drive shaft 51 and the low-speed drive shaft 52 are rotated by an electric motor for high-speed rotation and an electric motor for low-speed rotation, which are not shown in the drawings, respectively.

Figure 3:
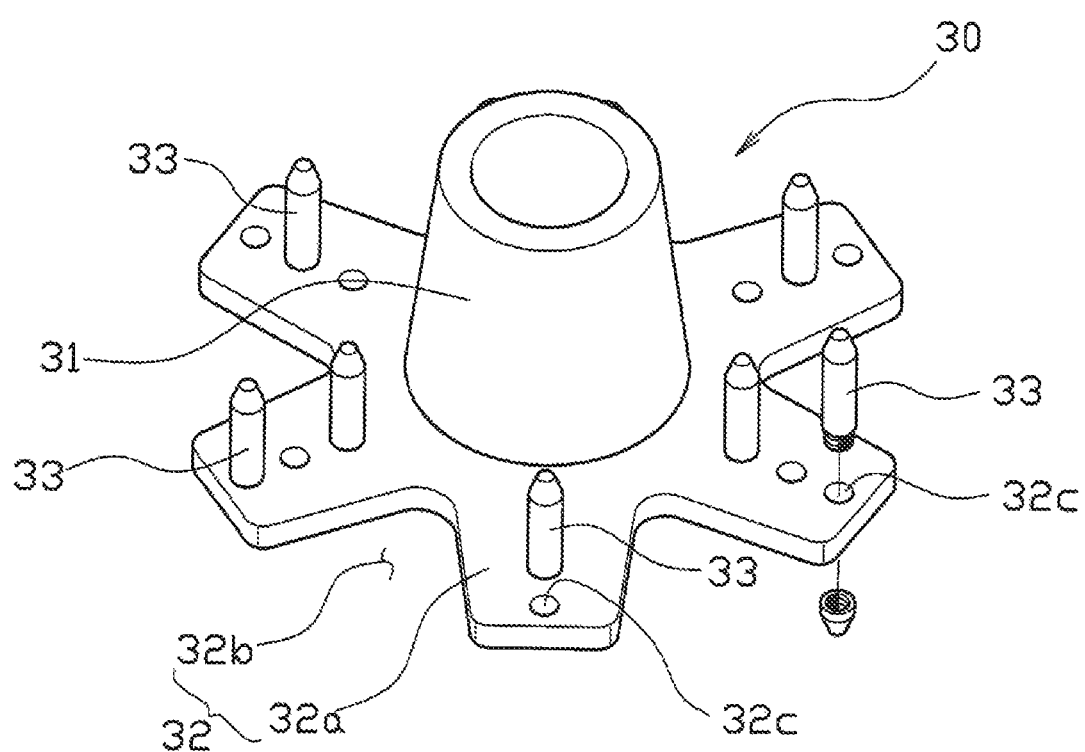
FIG. 3 is a perspective view illustrating a high-speed stirring body shown in FIG. 2.

The high-speed stirring body 30 is located at a lower center of the container 10, and functions to uniformly stir the mixed material while flowing the same at a high speed. As shown in FIG. 3, the high-speed stirring body 30 has a simple configuration including a conical part 31, a rotary plate 32, and stirring rods 33, such that it is possible to minimize a rotational load applied thereto during stirring due to the simple configuration.

That is, the conical part 31 of the high-speed stirring body 30 is fixed to an outer circumferential surface of the high-speed drive shaft 51, and has a shape whose lower end outer diameter is larger than the upper end outer diameter. The rotary plate 32 is provided at a lower portion of the conical part 31 and is formed in a plate shape in which a plurality of stirring pieces 32a and stirring grooves 32b are alternately arranged in a radial direction about a rotational axis of the high-speed drive shaft 51. Each of the stirring rods 33 is formed in a circular rod shape, and is vertically fixed to the stirring piece 32a of the rotary plate 32 in a direction of the rotational axis of the high-speed drive shaft 51.

Further, a plurality of fixing holes 32c are formed in the stirring piece 32a of the rotary plate 32 in the radial direction, and the stirring rods 33 are detachably installed in the fixing holes 32c, so that the number and installation positions of the stirring rods 33 may be adjusted, that is, may be increased or decreased corresponding to a change in a rotational load according to a type and a mixing ratio of materials to be mixed during stirring.

At this time, the present embodiment exemplifies a configuration in which six stirring pieces 32a and stirring grooves 32b are formed in the rotary plate 32, and three fixing holes 32c are formed in one stirring piece 32a, but it is not limited thereto. The number of these components may be increased or decreased in an extent without departing from the scope of achieving the objects of the present invention.

Referring again to FIG. 2, the low-speed stirring body 40 includes vertical wing parts 41, horizontal wing parts 42, and inclined wing parts 43.

The vertical wing part 41 is vertically installed close to the inner circumferential surface 12 of the container 10, and functions to move the mixed material in close proximity to the inner circumferential surface 12 of the container 10 toward the center.

The horizontal wing part 42 horizontally extends from a lower end of the vertical wing part 41 close to the bottom surface 11 of the container 10 toward the center, and functions to move the mixed material in close proximity to the bottom surface 11 and corner portions of the container 10 upward.

The inclined wing part 43 connects an upper end of the vertical wing part 41 and a lower end of the low-speed drive shaft 52.

Figure 4:
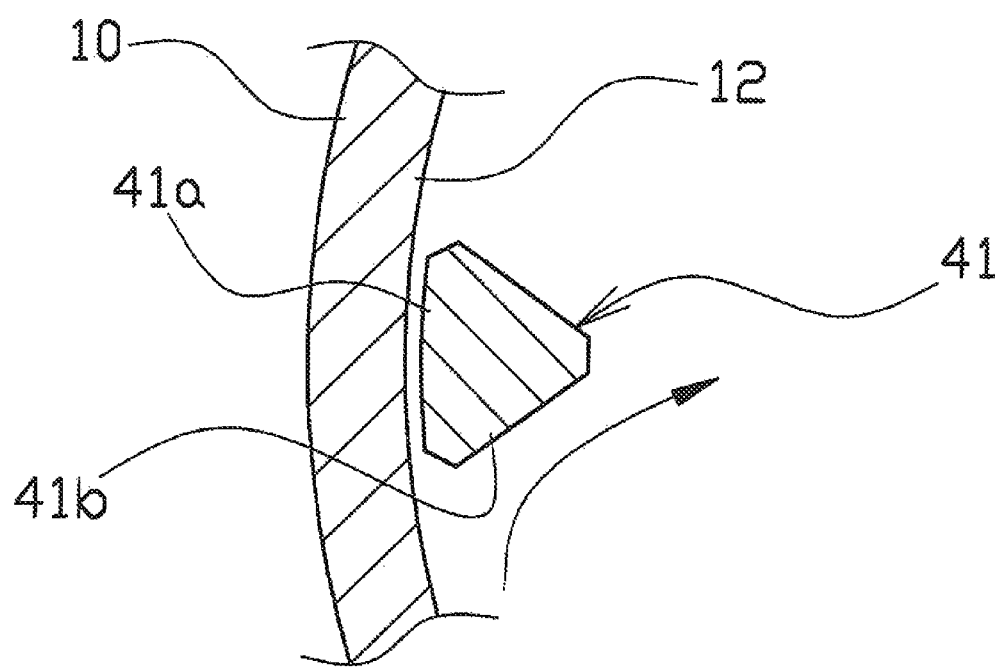
FIG. 4 is a cross-sectional view taken on line A-A in FIG. 2.

As shown in FIG. 4, the vertical wing part 41 has a cross-sectional shape including a curved blade section 41a corresponding to the inner circumferential surface 12 of the container 10, and vortex forming sections 41b formed slantly in directions in which ends thereof meet each other at both ends of the blade section 41a. The blade section 41a functions to remove the mixed material adhered to the inner circumferential surface 12 of the container 10, and the vortex forming sections 41b function to move the mixed material in close proximity to the inner circumferential surface 12 of the container 10 toward the center, thus to collide with the mixed material flowing at a high speed by the high-speed stirring body 30 to form a vortex.

Figure 5:
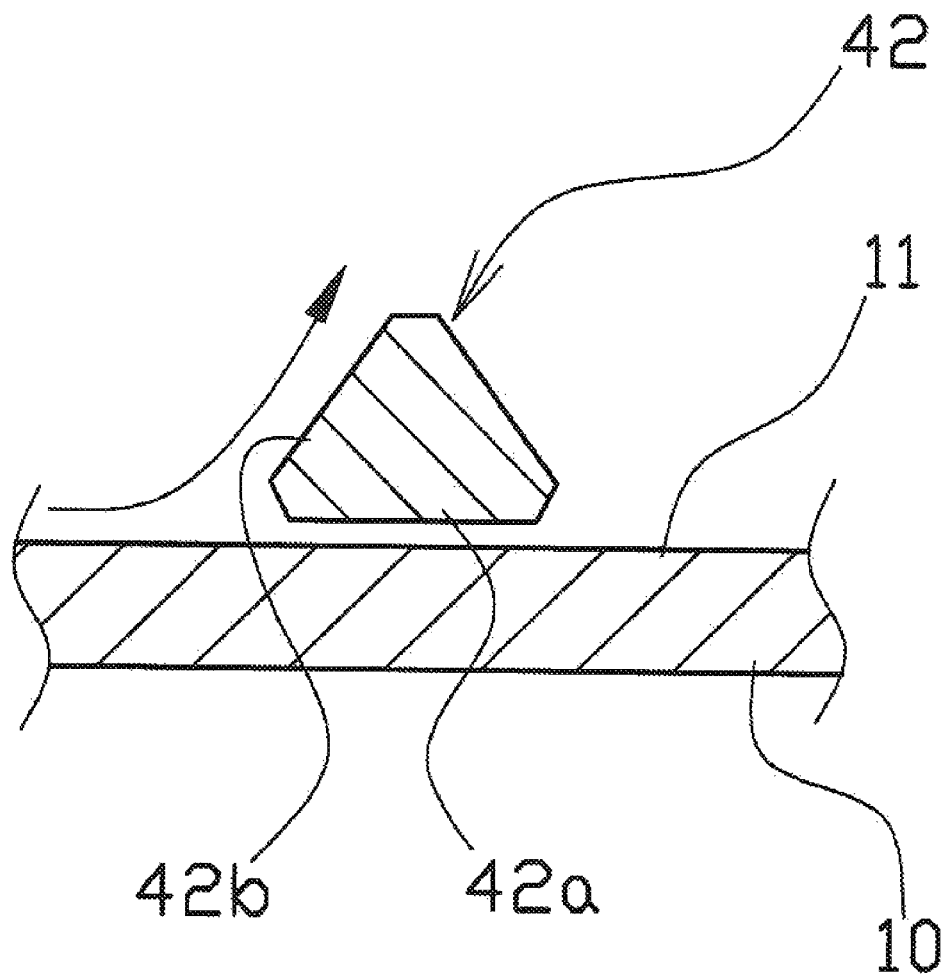
FIG. 5 is a cross-sectional view taken on line B-B in FIG. 2.

In addition, as shown in FIG. 5, the horizontal wing part 42 has a cross-sectional shape including a blade section 42a having a flat shape corresponding to the bottom surface 11 of the container 10, and vortex forming sections 42b formed slantly in directions in which ends thereof meet each other at both ends of the blade section 42a. The blade section 42a functions to remove the mixed material adhered to the bottom surface 11 of the container 10, and the vortex forming sections 42b function to remove the mixed material in close proximity to the bottom surface 11 of the container 10 upward, thus to collide with the mixed material flowing at a high speed by the high-speed stirring body 30 to form a vortex.

Rotation directions of the high-speed stirring body 30 and the low-speed stirring body 40 are set to be opposite to each other to maximize the formation of vortices, and thereby improving stirring efficiency.

Referring again to FIG. 2, the slurry mixer of the present invention is configured to feed the liquid material through liquid injection nozzles 62 separately provided in the cover 20. A plurality of liquid injection nozzles 62 are mounted in cylindrical nozzle sockets 61 and installed in a circumferential direction of the cover 20.

Figure 6:
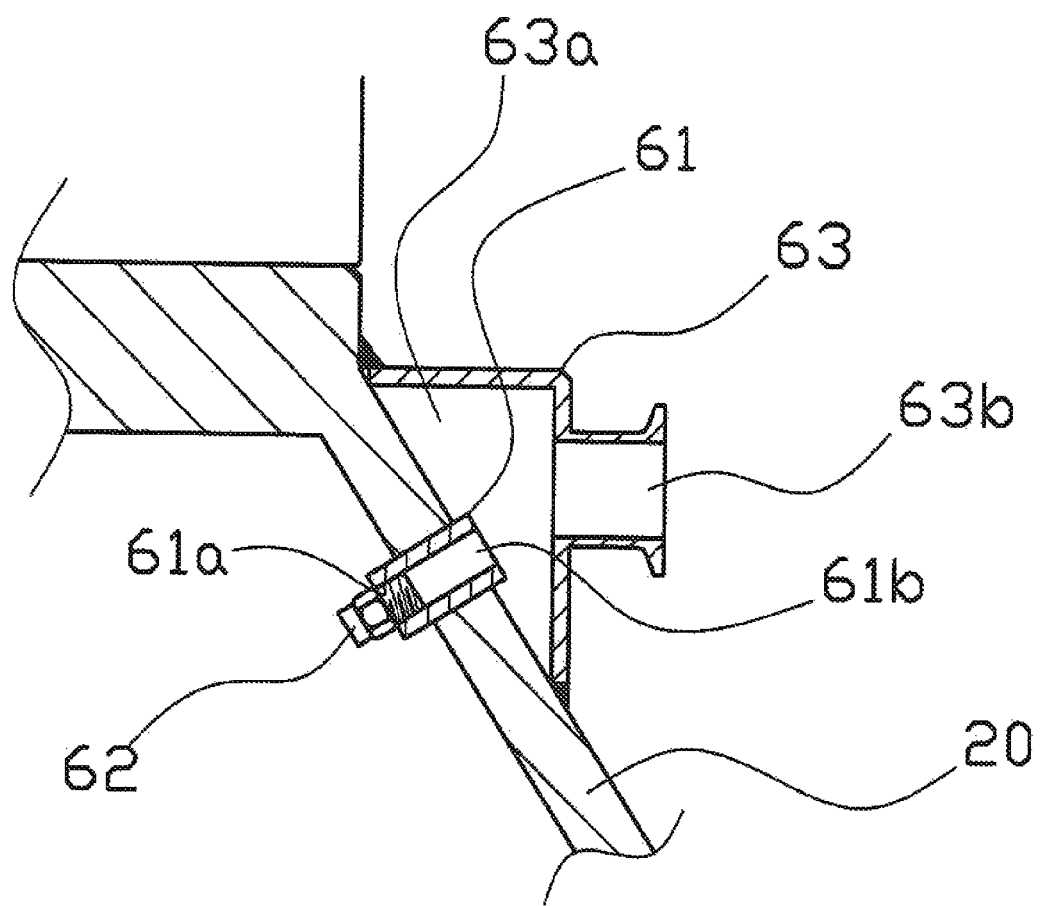
FIG. 6 is an enlarged view of major portions illustrating an installation state of a liquid injection nozzle shown in FIG. 2.

As shown in FIG. 6, the nozzle socket 61 is coupled to the cover 20 in a penetration manner, and has a first opening 61a formed at one end thereof on an inner side of the cover 20, and a second opening 61b formed at the other end thereof on an outer side of the cover 20.

The liquid injection nozzle 62 is screwed to the first opening 61a of each nozzle socket 61 so as to inject the liquid material toward an upper portion of the low-speed stirring body 40 inside the container 10 upon the installation. The liquid injection nozzle 62 is used so as to inject a liquid in a form of a shower.

The cover 20 is provided with a liquid supply chamber lid 63. The liquid supply chamber lid 63 is fixed to the cover 20 along an outer wall surface thereof so as to form a liquid supply chamber 63a connecting all area defined in the circumferential direction of the cover 20, while blocking the second opening 61b of each nozzle socket 61 from an outside. The liquid supply chamber lid 63 is fixed to the cover 20 by welding, thereby achieving water tightness in the liquid supply chamber 63a while fixing the liquid supply chamber lid 63.

The liquid supply chamber lid 63 has a liquid supply port 63b formed therein so that a liquid supply device (not shown) can be connected thereto. Therefore, it is possible to supply the liquid mixture material through the liquid supply port 63b into the liquid supply chamber 63a.

Accordingly, when the liquid material is supplied into the liquid supply chamber 63a through the liquid supply port 63b of the liquid supply chamber lid 63 at a high pressure, the liquid materials may be injected through the plurality of liquid injection nozzles 62 arranged at circumferences of the cover 20 to be supplied into the container 10, and the liquid materials adhered to or accumulated on the upper side face and the upper surface of the low-speed stirring body 40 are washed off using the liquid materials injected through the liquid injection nozzles 62.

Referring again to FIG. 2, the hollow low-speed drive shaft 52 of the present invention is rotatably supported by the cover 20 through a bearing with being vertically inserted therein, and the lower end thereof is fixed with the low-speed stirring body 40.

The high-speed drive shaft 51 is rotatably supported by the low-speed drive shaft 52 through a bearing with being vertically inserted therein, and the lower end thereof is fixed with the high-speed stirring body 30.

A first bearing 51a is disposed inside the cover 20 between the high-speed drive shaft 51 and the low-speed drive shaft 52 so as to rotatably support the high-speed drive shaft 51, and a second bearing 51b is disposed between an upper end portion of the high-speed drive shaft 51 and an upper end face of the low-speed drive shaft 52 so as to rotatably support the high-speed drive shaft 51.

The slurry mixer of the present invention has a cooling means for preventing the high-speed drive shaft 51 and the bearings 51a and 51b from being overheated by a high heat generated in the container 10 and a high heat generated due to the rotation and the rotatably supported structure of the high-speed drive shaft 51.

Figure 7:
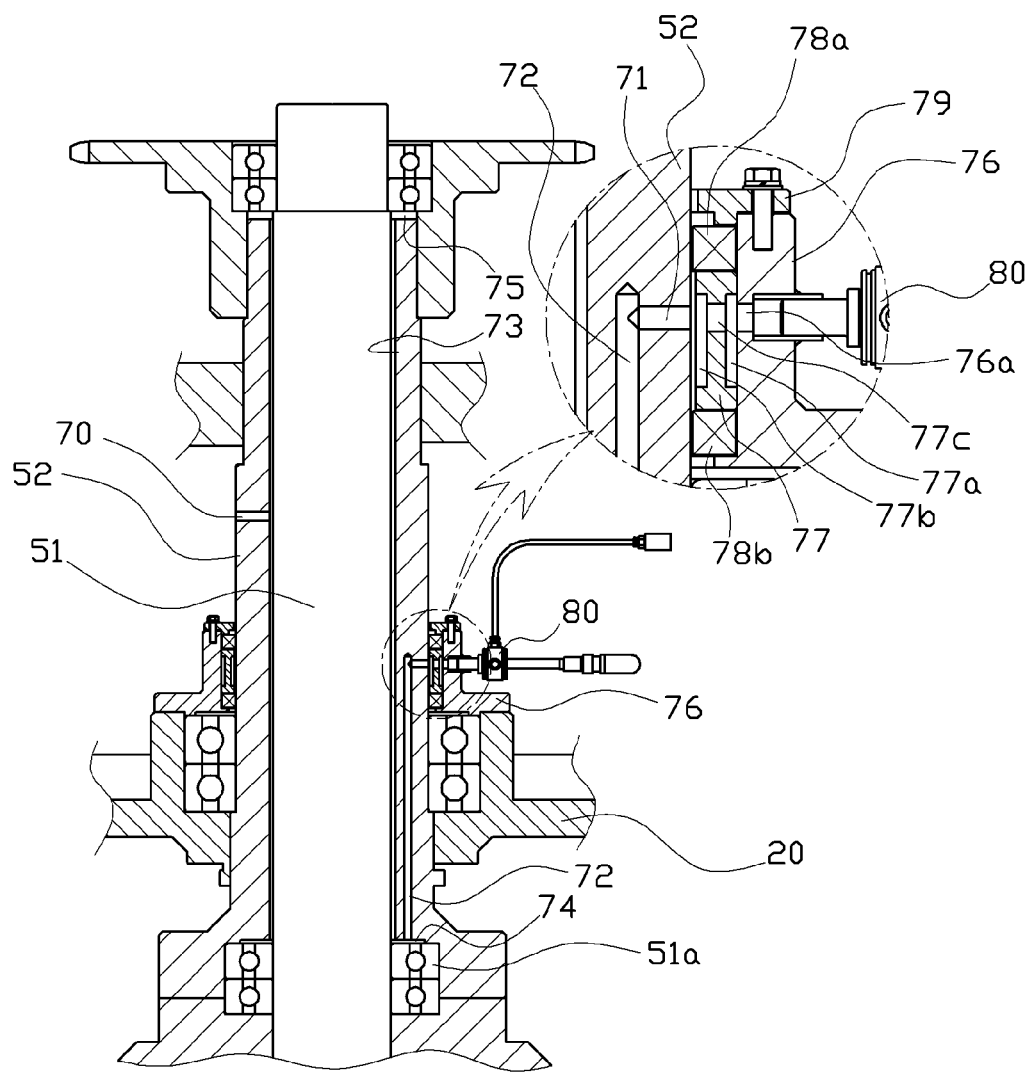
FIG. 7 is an enlarged view of the major portions illustrating a cooling means of a high-speed drive shaft and bearings.

As shown in FIG. 7, the cooling means includes a first air passage 71 formed by drilling a body of the low-speed drive shaft 52 located outside the cover 20 inward, a first cooling jacket 74 formed between one side of the first bearing 51a and an opposite face of the low-speed drive shaft 52 facing thereto, and a second cooling jacket 75 formed between one side of the second bearing 51b and the opposite face of the low-speed drive shaft 52 facing thereto.

Further, the cooling means includes a second air passage 72 formed by drilling the body of the low-speed drive shaft 52 so as to communicate the first air passage 71 with the first cooling jacket 74, and a third air passage 73 formed in an inner circumferential surface of the low-speed drive shaft 52 surrounding the high-speed drive shaft 51 so as to communicate the first cooling jacket 74 with the second cooling jacket 75. Therefore, a cooling passage is formed to communicate the first air passage 71, the second air passage 72, the first cooling jacket 74, the third air passage 73, and the second cooling jacket 75 in this order.

In addition, the cover 20 is provided with a housing 76 fixed thereto so as to surround the first air passage 71 of the low-speed drive shaft 52 in the circumferential direction, and a ring body 77 installed between the low-speed drive shaft 52 and the housing 76.

The housing 76 has an air inlet hole 76a formed therein at a position facing the first air passage 71. The ring body 77 has a first air chamber 77a formed in a surface thereof facing the air inlet hole 76a of the housing 76 so as to surround the air inlet hole 76a in the circumferential direction, a second air chamber 77b formed in a surface thereof facing the first air passage 71 of the low-speed drive shaft 52 so as to surround the first air passage 71 in the circumferential direction, and a through hole 77c formed therein so as to communicate the first air chamber 77a with the second air chamber 77b.

Therefore, a cooling air flowing into the air inlet hole 76a of the non-rotating housing 76 may be supplied to the first air passage 71 of the rotating low-speed drive shaft 52 through the first and second air chambers 77a and 77b connected to the through hole 77c of the ring body 77.

A cover plate 79 is detachably fixed to an upper end of the housing 76 to prevent the ring body 77 from being removed.

Preferably, first and second sealing members 78a and 78b are installed between an upper surface of the ring body 77 and the cover plate 79 and between a bottom surface of the ring body 77 and the housing 76, so as to maintain airtightness in the first and second air chambers 77a and 77b.

Preferably, an air cooling device 80, for example a vortex tube known in the art, is installed in the air inlet hole 76a of the housing 76 to supply the cooling air to the high-speed drive shaft 51 and the bearings 51a and 51b, thereby improving cooling performance thereof.

Hereinafter, an operation of the slurry mixer according to the present invention having the above-described configuration will be described.

As shown in FIG. 2, in the slurry mixer of the present invention, when feeding a mixed material including a liquid material containing an electrode active material, a conductive material, a binder and a solvent for dissolving the binder, and a powdery material into the container 10 at once, rotating the high-speed stirring body 30 through the high-speed drive shaft 51, and simultaneously rotating the low-speed stirring body 40 through the low-speed drive shaft 52, the mixed material in the container 10 may be uniformly separated and mixed to prepare a slurry for a battery electrode.

Figure 8:
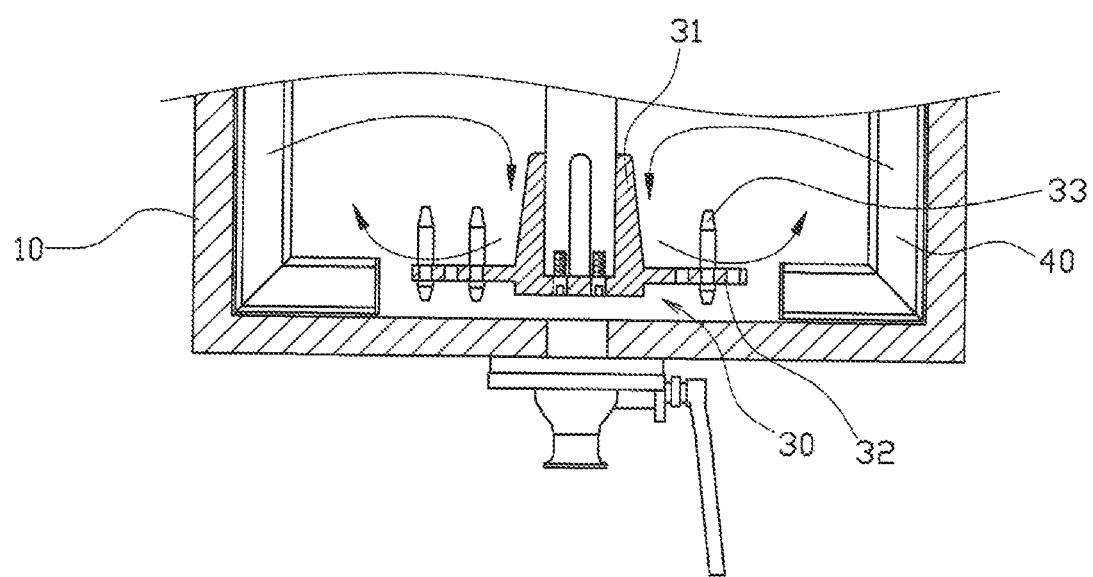
FIG. 8 is an enlarged view of the major portions illustrating an operation of the high-speed stirring body.

In the stirring process of the mixed material, as shown in FIG. 8, the mixed material fed into the container 10 and located at the center is guided toward the stirring rods 33 by the conical part 31 of the high-speed stirring body 30 which rotates at a high speed, and then the mixed material at the stirring rods 33 side is again guided to an edge of the container 10 due to a centrifugal force while being rotated at a high speed by the rotary plate 32 and the stirring rods 33. Subsequently, the mixed material that has been moved to the edge of the container 10 is again moved toward the center by the low-speed stirring body 40.

Figure 9:
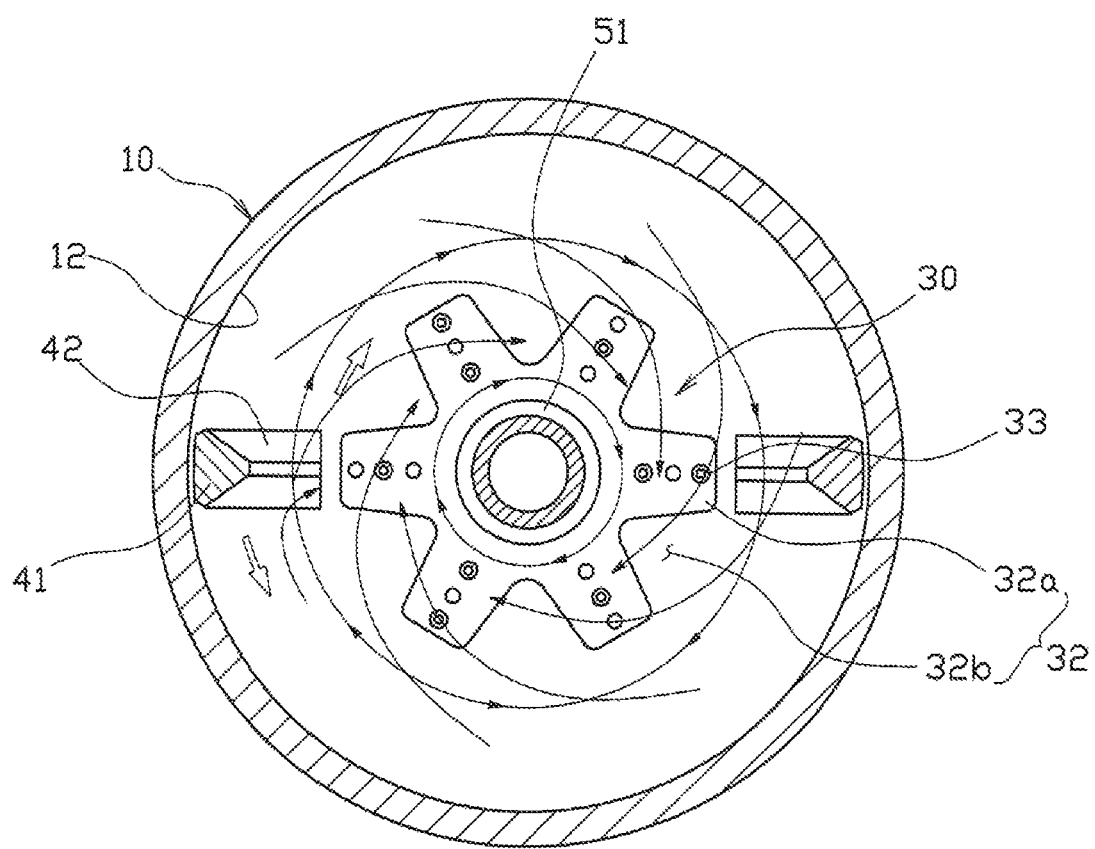
FIG. 9 is a plan view illustrating the operation of the high-speed stirring body.

In addition, as shown in FIG. 9, the mixed material moves vertically while rotating at a high speed in the circumferential direction about the high-speed stirring body 30, and is uniformly dispersed and mixed by the rotary plate 32 and the stirring rods 33 of the high-speed stirring body 30 to be prepared in a slurry form.

At this time, the high-speed stirring body 30 of the present invention includes the conical part 31, the rotary plate 32 and the stirring rods 33, such that the configuration is very simplified and a weight thereof is light. The rotary plate 32 and the stirring rod 33 is formed in a plate shape and a rod shape, respectively, so as to minimize a contact area with the mixed material with respect the rotation direction. Therefore, the rotational load acting upon stirring may be minimized. Thereby, a rotational speed of the high-speed drive shaft 51 may be further increased as the rotational load is reduced.

Figure 10:
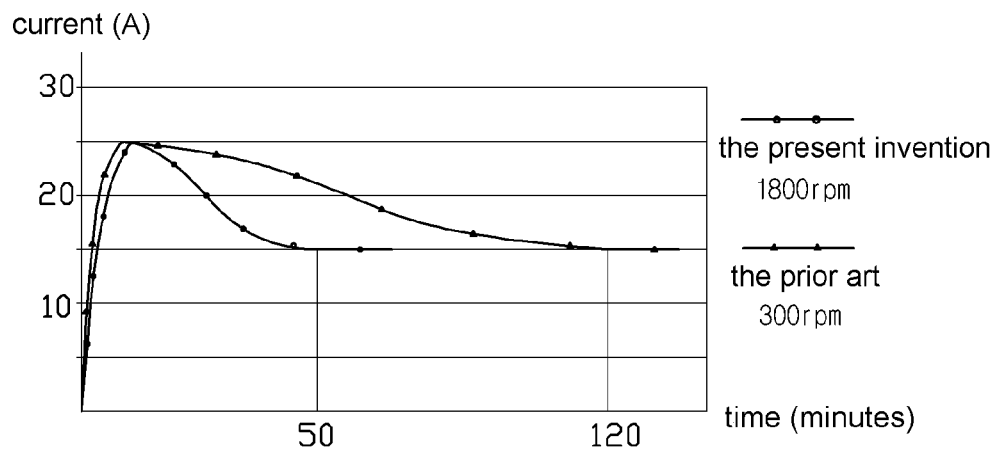
FIG. 10 is a graph illustrating a relationship between a rotational load of an electric motor and a stirring time in the present invention.

For example, FIG. 10 is a comparative graph illustrating a relationship between the rotational load and the stirring time of the electric motor for rotating the high-speed stirring body 30 of the present invention and an impeller of the prior art. Herein, a configuration, in which the same mixed material is stirred using the electric motor having the same output, was set, and a current A of the electric motor was measured to determine the rotational load of the electric motor.

In general, the electric motors are set to have different rated currents at rated torque and output, respectively, and the rotational load and the current required for driving the electric motor are a proportional relationship to each other. For example, the rated current of an electric motor used for stirring the slurry in a mixer to which the present invention belongs is known as 28 to 30 A.

First, in the prior art, when setting an initial rotational load of the electric motor to 25 A after the start of stirring, the rotational speed of first to third impellers may be set to a maximum of 300 rpm. When stirring the mixed material at such a rotational speed, it takes a time of about 120 minutes.

However, in the present invention, when setting the initial rotational load of the electric motor after the start of stirring to 25 A, the rotational load of the high-speed stirring body 30 of the present invention is lower than the first to third impellers of the prior art due to the simplified configuration. Therefore, it is possible to smoothly drive the electric motor to a maximum of 1800 rpm. Thereby, the stirring time was about 50 minutes, and it was possible to reduce it by more than two times.

Further, according to the present invention, a particle size or specific gravity of the powdery material may be changed or the mixing ratio of the powdery material may be increased or decreased depending on types of the mixed material. In this case, the rotational load of the high-speed electric motor for rotating the high-speed stirring body 30 may be increased or decreased.

As shown in FIG. 3, the stirring rod 33 of the high-speed stirring body 30 according to the present invention is detachably installed in the fixing hole 32c of the rotary plate 32. Therefore, it is possible to control the rotational load of the high-speed electric motor to an optimum state corresponding to the type of mixed material by changing the number of the stirring rods 33 to be installed or changing the installation positions of the stirring rods 33 using the plurality of fixing holes 32c, and thereby the stirring operation may be efficiently performed.

In addition, as shown in FIGS. 2, 4 and 5, the low-speed stirring body 40 of the present invention may separate the mixed material adhered to the inner circumferential surface 12 and the bottom surface 11 of the container 10 by the blade sections 41a and 42a of the vertical and horizontal wing parts 41 and 42, and may move the mixed material separated by the vortex forming sections 41b and 42b toward the center.

Thereby, the mixed material may be more uniformly stirred in the container 10, and the mixing member moving toward the center by the low-speed stirring body 40 collides with the mixed material rotating at a high speed to form a vortex, such that the stirring efficiency may be further increased.

Meanwhile, as shown in FIG. 2, some powdery material may be adhered to or accumulated on the upper side face and the upper surface of the low-speed stirring body 40 during feeding the mixed material through the feed port 21 of the cover 20. However, according to the present invention, when feeding into the container 10, the liquid material is fed in a shower form through the liquid injection nozzles 62 provided in the cover 20, thus to wash off the powdery materials adhered to or accumulated on the upper side face and the upper surface of the low-speed stirring body 40.

That is, as shown in FIGS. 2 and 6, when the liquid material is supplied into the liquid supply chamber 63a at a high pressure through the liquid supply port 63b of the liquid supply chamber lid 63 provided in the cover 20, since the liquid supply chamber 63a is communicated with the second openings 61b of the plurality of nozzle sockets 61 arranged in the circumferential direction of the cover 20, the liquid material is injected at a high pressure toward the upper portion of the low-speed stirring body 40 through each liquid injection nozzle 62. Due to the above-described operations, it is possible to simultaneously perform the function of feeding the liquid material into the container 10, and the function of washing off the powdery materials adhered to or accumulated on the upper side face and the upper surface of the low-speed stirring body 40.

Further, as shown in FIGS. 2 and 7, when supplying the cooling air into the first air chamber 77a of the ring body 77 by the air cooling device 80 installed in the air inlet hole 76a of the housing 76, the cooling air is supplied to the second air chamber 77b through the through hole 77c, and then may be supplied to the first air passage 71 of the low-speed drive shaft 52.

Since the first air chamber 77a is configured to surround the air inlet hole 76a of the housing 76, which is a fixed body, in the circumferential direction, and the second air chamber 77b is configured to surround the first air passage 71 of the low-speed drive shaft 52, which is a rotating body, in the circumferential direction, it is possible to supply the cooling air to the rotating low-speed drive shaft 52 with respect to the non-rotating housing 76.

Then, the cooling air flowing into the first air passage 71 of the low-speed drive shaft 52 flows to the second air passage 72, the first cooling jacket 74, the third air passage 73, and the second cooling jacket 75 in this order, so as to perform the cooling operation for the high-speed drive shaft 51 and the bearings 51a and 51b which rotatably support the same. The cooling air having undergone the cooling operation is discharged to the outside through a discharge port 70 formed at one side of the low-speed drive shaft 52.

Thereby, a degradation in the performance or failure, which may occur by overheating the high-speed drive shaft 51 and the bearings 51a and 51b, may be prevented, and a reduction in the life span due to a deterioration of the components when using in long-term may be prevented.

Figure 11:
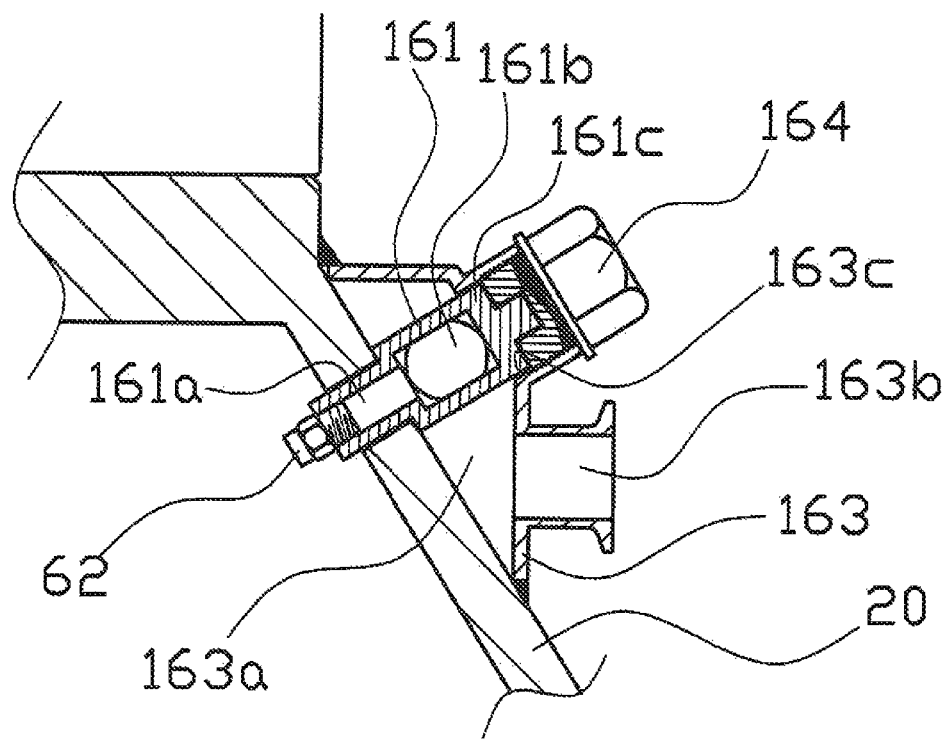
FIG. 11 is a cross-sectional view illustrating another example of installing the liquid injection nozzle.

FIG. 11 is a cross-sectional view illustrating another example of installing the liquid injection nozzle 62 in the slurry mixer for a battery electrode of the above-described embodiment, in which the liquid injection nozzle 62 is configured to be easily replaced. The remaining configuration is the same as that of the above-described embodiment. Therefore, the same reference numerals are assigned to the same components, and the configuration and the operation will not be described in detail.

Figure 12:
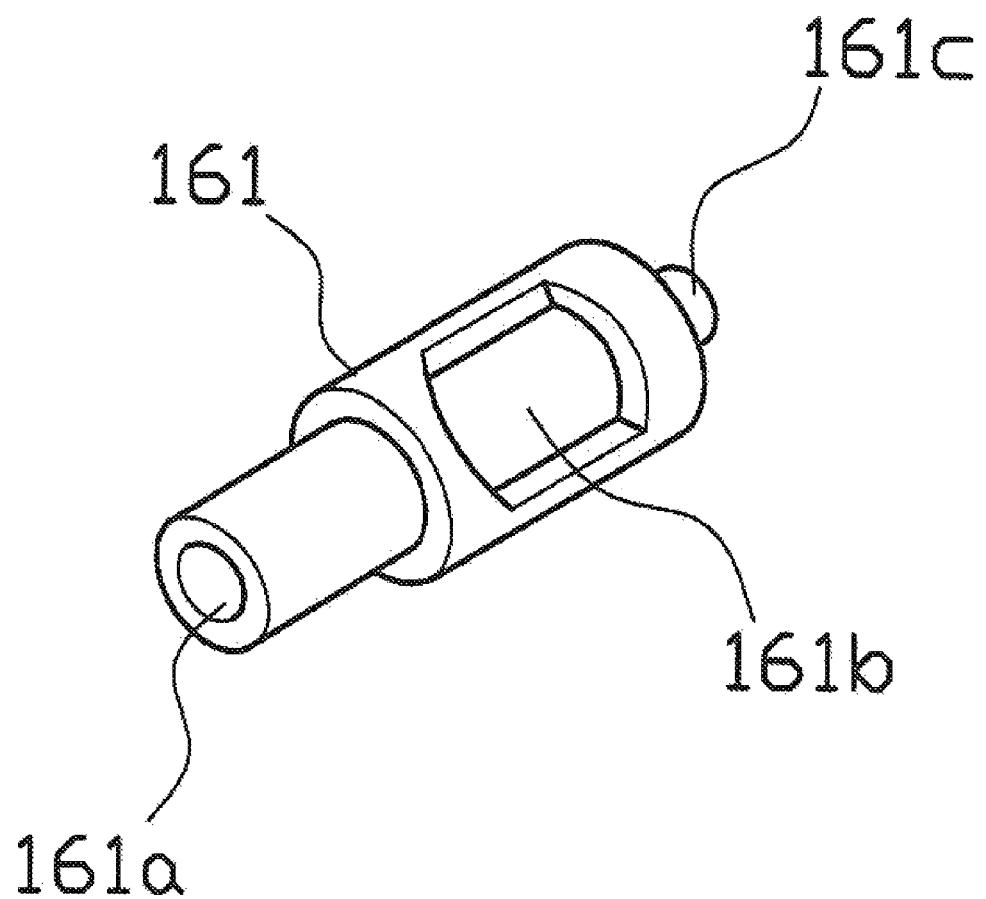
FIG. 12 is a perspective view illustrating a nozzle socket shown in FIG. 11.
Figure 13:
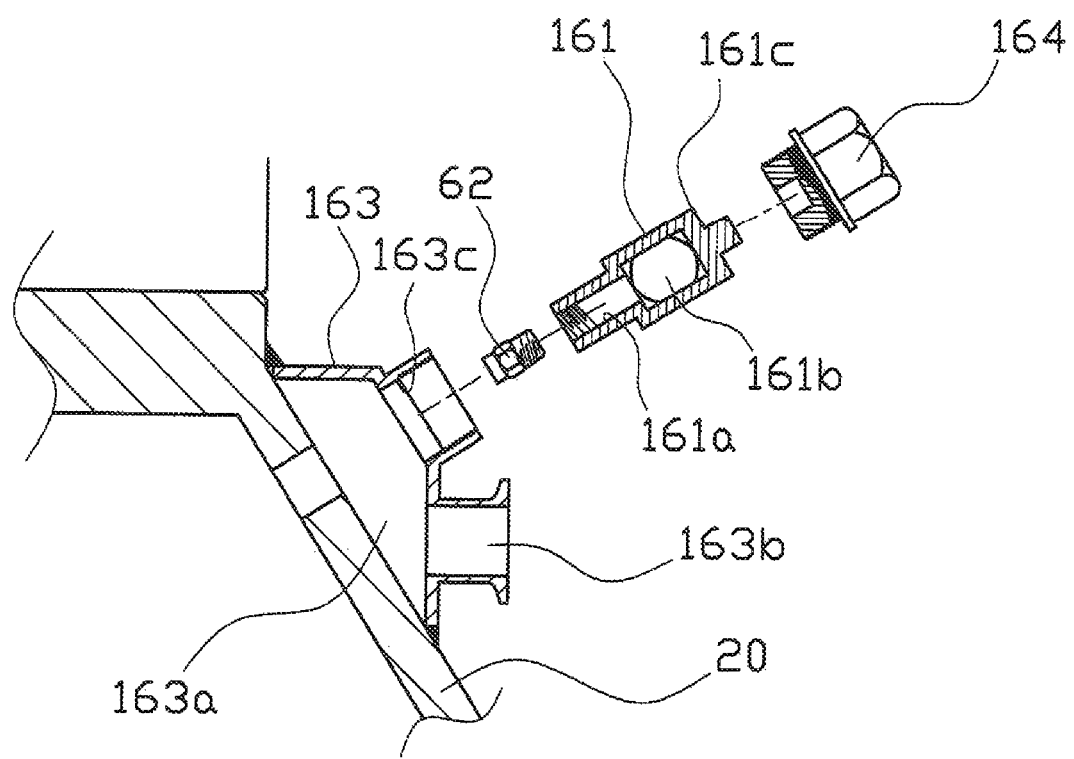
FIG. 13 is an exploded cross-sectional view illustrating an installed state of the liquid injection nozzle in shown FIG. 11.

As shown in FIGS. 11 and 12, a plurality of cylindrical nozzle sockets 161 to which the liquid injection nozzles 62 are mounted and fitted to the cover 20 in a penetration manner while being arranged along the circumference of the cover 20. The nozzle socket 161 has a first opening 161a formed at one end thereof on the inner side of the cover 20, a closed end 161c formed at the other end thereof on the outer side of the cover 20, and a second opening 161b formed between the first opening 161a and the closed end 161c.

The liquid injection nozzle 62 is screwed to the first opening 161a of each nozzle socket 161 so as to inject the liquid material toward the upper portion of the low-speed stirring body 40 inside the container 10.

In addition, the cover 20 is provided with a liquid supply chamber lid 163, which is fixed to the cover 20 along the outer wall surface thereof so as to form a liquid supply chamber 163a connecting all area defined in the circumferential direction of the cover 20, while blocking the second opening 161b of each nozzle socket 161 from the outside. The liquid supply chamber lid 163 is fixed to the cover 20 by welding, thereby simultaneously achieving water tightness in the liquid supply chamber 163a and fixing thereof.

The liquid supply chamber lid 163 is provided with an assembly hole 163c through which an outer end of each nozzle socket 161 on the outer side of the cover 20 is inserted. A cap 164 is screwed to the assembly hole 163c of the liquid supply chamber lid 163 to open and close the assembly hole 163c. The cap 164 is fixed by pressing the outer end of the nozzle socket 161 during screwing.

A liquid supply port 163b may be formed in the liquid supply chamber lid 163 to supply the liquid material into the liquid supply chamber 163a.

According to another example of installing the liquid injection nozzle 62, the liquid injection nozzle 62 may be easily replaced or separated from the nozzle socket 161 without a difficult operation for separating the cover 20 from the container 10, and thereby it is possible to quickly cope with clogging or failure of the liquid injection nozzle 62.

That is, as shown in FIG. 11, when separating the cap 164 from the liquid supply chamber lid 163 in a state in which the liquid injection nozzle 62 is mounted in the nozzle socket 161 to be installed in the cover 20, the nozzle socket 161 and the liquid injection nozzle 62 may be easily removed from the cover 20 through the assembly hole 163c.

When the liquid injection nozzle 62 that has been repaired or replaced is screwed to the first opening 161a of the nozzle socket 161 and then inserted through the assembly hole 163c of the liquid supply chamber lid 163, the liquid injection nozzle 62 is installed while the nozzle socket 161 being fitted to the cover 20. Then when the cap 164 is screwed to the assembly hole 163c, the cap 164 closes the assembly hole 163c, and the closed end of the nozzle socket 161 is pressed to maintain the fixed state of the nozzle socket 161.

As such, since the operation of installing and separating the liquid injection nozzle 62 in and from the cover 20 is very convenient, it is very advantageous for maintenance and repair of the liquid injection nozzle 62.

While the present invention has been described with reference to several preferred embodiments, the present invention is not limited to the above-described exemplary embodiments, and it will be understood by those skilled in the art that various modifications and variations may be made within the detailed description of the invention and accompanying drawings without departing from the scope of the present invention as defined by the appended claims, as well as these modifications and variations should be included in the scope of the present invention according to doctrine of equivalents.

DESCRIPTION OF REFERENCE NUMERALS

10: Container
11: Bottom surface
12: Inner circumferential surface
20: Cover
21: Feed port
30: High-speed stirring body
31: Conical part
32: Rotary plate
33: Stirring rod
40: Low-speed stirring body
41: Vertical wing part
42: Horizontal wing part
43: Inclined wing part
51: High-speed drive shaft
52: Low-speed drive shaft
61, 161: Nozzle socket
62: Liquid injection nozzle
163: Liquid supply chamber lid
71, 72, 73: First, second and third air passages
74, 75: First and second cooling jackets
76: Housing
77: Ring body
80: Air cooling device

The invention claimed is:

1. A slurry mixer for a battery electrode, the slurry mixer comprising:
  a container whose upper portion is opened to receive a mixed material including a liquid material and a powdery material;
  a cover which is connected to the container to open and close the opened upper portion of the container and has feed ports formed therein so as to feed the mixed material into the container;
  a low-speed stirring body vertically installed along an inner circumferential surface of the container to move the mixed material in an edge portion of the container toward a center thereof;
  a hollow low-speed drive shaft rotatably supported by the cover with being vertically inserted therein, and fixed with the low-speed stirring body;
  a high-speed stirring body located at a lower center in the container to flow and stir the mixed material at a speed faster than that of the low-speed stirring body;
  a high-speed drive shaft rotatably supported by the low-speed drive shaft with being vertically inserted therein, and fixed with the high-speed stirring body, wherein the high-speed drive shafts rotates at a speed faster than that of the low-speed drive shaft;
  a plurality of cylindrical nozzle sockets which are coupled to the cover and arranged along a circumference of the cover, and have a first opening formed at one end thereof on an inner side of the cover, and a second opening formed at another end thereof on an outer side of the cover, respectively;
  liquid injection nozzles screwed to the first opening of each nozzle socket so as to inject the liquid material toward an upper portion of the low-speed stirring body inside the container;
  liquid supply chamber lids fixed to the cover along an outer wall surface thereof so as to form liquid supply chambers for blocking the second opening of each nozzle socket from an outside; and
  liquid supply ports provided in the liquid supply chamber lids to supply the liquid material into the liquid supply chambers,
  wherein the container includes a horizontal bottom surface, and the inner circumferential surface is vertically erected from the bottom surface,
  wherein the low-speed stirring body comprises:
  a vertical wing part vertically installed adjacent to the inner circumferential surface of the container and configured to move the mixed material in proximity to the inner circumferential surface of the container toward the center;
  a horizontal wing part horizontally extending from a lower end of the vertical wing part adjacent to the bottom surface of the container toward the center, and configured to move the mixed material in proximity to the bottom surface of the container upward; and
  an inclined wing part which connects an upper end of the vertical wing part and a lower end of the low-speed drive shaft,
  wherein the vertical wing part has a cross-sectional shape including a blade section which is formed in a curved surface corresponding to the inner circumferential surface of the container to remove the mixed material adhered to the inner circumferential surface of the container, and vortex forming sections formed slantly in directions in which ends thereof meet each other at both ends of the blade section to move the mixed material in proximity to the inner circumferential surface of the container toward the center, the horizontal wing part has a cross-sectional shape including a blade section formed in a flat shape corresponding to the bottom surface of the container to remove the mixed material adhering to the bottom surface of the container, and vortex forming sections formed slantly in directions in which ends thereof meet each other at both ends of the blade section to move the mixed material in proximity to the bottom surface of the container upward.

2. The slurry mixer according to claim 1, wherein the high-speed stirring body comprises:
   a conical part having a shape whose lower end outer diameter is larger than the upper end outer diameter;
   a rotary plate which is provided at a lower portion of the conical part and is formed in a plate shape in which a plurality of stirring pieces and stirring grooves are alternately arranged in a radial direction about a rotational axis of the high-speed drive shaft; and
   stirring rods vertically fixed to the stirring piece of the rotary plate in a direction of the rotational axis of the high-speed drive shaft.

3. The slurry mixer according to claim 2, wherein the rotary plate included in the high-speed stirring body has a plurality of fixing holes formed in the stirring pieces thereof in the radial direction, and the stirring rods are detachably installed in the fixing holes of the stirring pieces, so that the number and installation positions of the stirring rods are adjusted corresponding to a change in a rotational load during stirring.

4. A slurry mixer for a battery electrode, the slurry mixer comprising:
   a container whose upper portion is opened to receive a mixed material including a liquid material and a powdery material;
   a cover which is connected to the container to open and close the opened upper portion of the container and has feed ports formed therein so as to feed the mixed material into the container;
   a low-speed stirring body vertically installed along an inner circumferential surface of the container to move the mixed material in an edge portion of the container toward a center thereof;
   a hollow low-speed drive shaft rotatably supported by the cover with being vertically inserted therein, and fixed with the low-speed stirring body;
   a high-speed stirring body located at a lower center in the container to flow and stir the mixed material at a speed faster than that of the low-speed stirring body;
   a high-speed drive shaft rotatably supported by the low-speed drive shaft with being vertically inserted therein, and fixed with the high-speed stirring body, wherein the high-speed drive shafts rotates at a speed faster than that of the low-speed drive shaft;
   a plurality of cylindrical nozzle sockets which are fitted and detachably coupled to the cover and arranged along a circumference of the cover, and have a first opening formed at one end thereof on an inner side of the cover, a closed end formed at another end thereof on an outer side of the cover, and a second opening formed between the first opening and the closed end, respectively;
   liquid injection nozzles screwed to the first opening of each nozzle socket so as to inject the liquid material toward an upper portion of the low-speed stirring body inside the container;
   liquid supply chamber lids which respectively have an assembly hole through which an outer end of each nozzle socket is inserted, and are fixed to the cover along an outer wall surface thereof so as to form liquid supply chambers for blocking the second opening of each nozzle socket from an outside;
   a cap which is screwed to the assembly hole of the respective liquid supply chamber lid to open and close the assembly hole, and presses the outer end of the nozzle socket to maintain a fixed state of the nozzle socket; and
   liquid supply ports provided in the liquid supply chamber lids to supply the liquid material into the liquid supply chambers,
   wherein the container includes a horizontal bottom surface, and the inner circumferential surface is vertically erected from the bottom surface,
   wherein the low-speed stirring body comprises:
   a vertical wing part vertically installed adjacent to the inner circumferential surface of the container and configured to move the mixed material in proximity to the inner circumferential surface of the container toward the center;
   a horizontal wing part horizontally extending from a lower end of the vertical wing part adjacent to the bottom surface of the container toward the center, and configured to move the mixed material in proximity to the bottom surface of the container upward; and
   an inclined wing part which connects an upper end of the vertical wing part and a lower end of the low-speed drive shaft,
   wherein the vertical wing part has a cross-sectional shape including a blade section which is formed in a curved surface corresponding to the inner circumferential surface of the container to remove the mixed material adhered to the inner circumferential surface of the container, and vortex forming sections formed slantly in directions in which ends thereof meet each other at both ends of the blade section to move the mixed material in proximity to the inner circumferential surface of the container toward the center,
   the horizontal wing part has a cross-sectional shape including a blade section formed in a flat shape corresponding to the bottom surface of the container to remove the mixed material adhering to the bottom surface of the container, and vortex forming sections formed slantly in directions in which ends thereof meet each other at both ends of the blade section to move the mixed material in proximity to the bottom surface of the container upward.

5. The slurry mixer according to claim 4, further comprising:
   a first bearing disposed inside the cover between the high-speed drive shaft and the low-speed drive shaft so as to rotatably support the high-speed drive shaft, and a second bearing disposed between an upper end portion of the high-speed drive shaft and an upper end face of the low-speed drive shaft which are disposed outside the cover, so as to rotatably support the high-speed drive shaft;
   a first air passage formed by drilling a body of the low-speed drive shaft located outside the cover inward;

a first cooling jacket formed between one side of the first bearing and an opposite side of the low-speed drive shaft facing thereto;

a second cooling jacket formed between one side of the second bearing and the opposite side of the low-speed drive shaft facing thereto;

a second air passage formed by drilling a body of the low-speed drive shaft to communicate the first air passage with the first cooling jacket;

a third air passage formed in an inner circumferential surface of the low-speed drive shaft surrounding the high-speed drive shaft to communicate the first cooling jacket with the second cooling jacket;

a housing which is fixed to the cover so as to surround the first air passage of the low-speed drive shaft in a circumferential direction, and has an air inlet hole formed therein at a position facing the first air passage;

a ring body which is installed between the low-speed drive shaft and the housing, and has a first air chamber formed in a surface thereof facing the air inlet hole of the housing so as to surround the air inlet hole in the circumferential direction, a second air chamber formed in a surface thereof facing the first air passage of the low-speed drive shaft so as to surround the first air passage in the circumferential direction, and a through hole formed therein so as to communicate the first air chamber with the second air chamber;

an air cooling device installed in the air inlet hole of the housing to supply a cooling air;

a cover plate fixed to an upper end of the housing to prevent the ring body from being removed;

a first seal member provided between an upper surface of the ring body and the cover plate; and a second seal member provided between a bottom surface of the ring body and the housing.

6. The slurry mixer according to claim 4, wherein the high-speed stirring body comprises:

a conical part having a shape whose lower end outer diameter is larger than the upper end outer diameter;

a rotary plate which is provided at a lower portion of the conical part and is formed in a plate shape in which a plurality of stirring pieces and stirring grooves are alternately arranged in a radial direction about a rotational axis of the high-speed drive shaft; and stirring rods vertically fixed to the stirring piece of the rotary plate in a direction of the rotational axis of the high-speed drive shaft.

7. A slurry mixer for a battery electrode, the slurry mixer comprising:

a container whose upper portion is opened to receive a mixed material including a liquid material and a powdery material;

a cover which is connected to the container to open and close the opened upper portion of the container and has feed ports formed therein so as to feed the mixed material into the container;

a low-speed stirring body vertically installed along an inner circumferential surface of the container to move the mixed material in an edge portion of the container toward a center thereof;

a hollow low-speed drive shaft rotatably supported by the cover with being vertically inserted therein, and fixed with the low-speed stirring body;

a high-speed stirring body located at a lower center in the container to flow and stir the mixed material at a speed faster than that of the low-speed stirring body;

a high-speed drive shaft rotatably supported by the low-speed drive shaft with being vertically inserted therein, and fixed with the high-speed stirring body, wherein the high-speed drive shafts rotates at a speed faster than that of the low-speed drive shaft;

a plurality of cylindrical nozzle sockets which are coupled to the cover and arranged along a circumference of the cover, and have a first opening formed at one end thereof on an inner side of the cover, and a second opening formed at another end thereof on an outer side of the cover, respectively;

liquid injection nozzles screwed to the first opening of each nozzle socket so as to inject the liquid material toward an upper portion of the low-speed stirring body inside the container;

liquid supply chamber lids fixed to the cover along an outer wall surface thereof so as to form liquid supply chambers for blocking the second opening of each nozzle socket from an outside; and liquid supply ports provided in the liquid supply chamber lids to supply the liquid material into the liquid supply chambers;

a first bearing disposed inside the cover between the high-speed drive shaft and the low-speed drive shaft so as to rotatably support the high-speed drive shaft, and a second bearing disposed between an upper end portion of the high-speed drive shaft and an upper end face of the low-speed drive shaft which are disposed outside the cover, so as to rotatably support the high-speed drive shaft;

a first air passage formed by drilling a body of the low-speed drive shaft located outside the cover inward;

a first cooling jacket formed between one side of the first bearing and an opposite side of the low-speed drive shaft facing thereto;

a second cooling jacket formed between one side of the second bearing and the opposite side of the low-speed drive shaft facing thereto;

a second air passage formed by drilling a body of the low-speed drive shaft to communicate the first air passage with the first cooling jacket;

a third air passage formed in an inner circumferential surface of the low-speed drive shaft surrounding the high-speed drive shaft to communicate the first cooling jacket with the second cooling jacket;

a housing which is fixed to the cover so as to surround the first air passage of the low-speed drive shaft in a circumferential direction, and has an air inlet hole formed therein at a position facing the first air passage;

a ring body which is installed between the low-speed drive shaft and the housing, and has a first air chamber formed in a surface thereof facing the air inlet hole of the housing so as to surround the air inlet hole in the circumferential direction, a second air chamber formed in a surface thereof facing the first air passage of the low-speed drive shaft so as to surround the first air passage in the circumferential direction, and a through hole formed therein so as to communicate the first air chamber with the second air chamber;

an air cooling device installed in the air inlet hole of the housing to supply a cooling air;

a cover plate fixed to an upper end of the housing to prevent the ring body from being removed;

a first seal member provided between an upper surface of the ring body and the cover plate; and a second seal member provided between a bottom surface of the ring body and the housing.

* * * * *